(12) United States Patent
Yamaki et al.

(10) Patent No.: US 10,684,472 B2
(45) Date of Patent: Jun. 16, 2020

(54) SEE-THROUGH LAYERED BODY, TRANSPARENT SCREEN COMPRISING SAME, AND IMAGE PROJECTION DEVICE COMPRISING SAME

(71) Applicant: JXTG NIPPON OIL & ENERGY CORPORATION, Tokyo (JP)

(72) Inventors: Kousuke Yamaki, Tokyo-to (JP); Suzushi Nishimura, Tokyo-to (JP); Akira Matsuo, Tokyo-to (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 16/357,491

(22) Filed: Mar. 19, 2019

(65) Prior Publication Data

US 2019/0212555 A1 Jul. 11, 2019

Related U.S. Application Data

(62) Division of application No. 15/555,624, filed as application No. PCT/JP2016/055942 on Feb. 26, 2016.

(30) Foreign Application Priority Data

Mar. 6, 2015 (JP) ................................. 2015-044706

(51) Int. Cl.
*G02B 5/02* (2006.01)
*G02B 27/01* (2006.01)
(Continued)

(52) U.S. Cl.
CPC ............ *G02B 27/0101* (2013.01); *B32B 7/02* (2013.01); *B32B 17/10614* (2013.01);
(Continued)

(58) Field of Classification Search
CPC .......... B32B 2605/00; B32B 2605/006; B32B 2605/08; B32B 17/10036; B32B 2250/03;
(Continued)

(56) References Cited

U.S. PATENT DOCUMENTS

| 5,830,568 A | 11/1998 | Kondo |
| 6,315,848 B1 | 11/2001 | Kondo |

(Continued)

FOREIGN PATENT DOCUMENTS

| CN | 101002139 | 7/2007 |
| EP | 1 929 367 | 6/2008 |

(Continued)

OTHER PUBLICATIONS

International Search Report dated May 17, 2016 in International Application No. PCT/JP2016/055942.

(Continued)

*Primary Examiner* — Laura A Auer
(74) *Attorney, Agent, or Firm* — Wenderoth, Lind & Ponack, L.L.P.

(57) ABSTRACT

[Problem] Provided is a see-through layered body which allows obtaining a projection type image display transparent screen with a wide viewing angle, and excellent image clarity and transparency.
[Solving means] A see-through layered body according to the present invention comprises an intermediate resin film, two transparent substrates holding the intermediate resin film, wherein the intermediate resin film comprises a resin and from 0.0001 to 15% by mass of microparticles, having an average diameter of from 1 nm to 100 μm, and the center plane average roughness SRa of outermost surfaces on both sides of the layered body is from 0.05 to 5.5 nm.

11 Claims, 1 Drawing Sheet

(51) Int. Cl.
  *B32B 17/10* (2006.01)
  *E06B 3/66* (2006.01)
  *B32B 7/02* (2019.01)
  *E06B 3/70* (2006.01)
  *E06B 5/00* (2006.01)
  *G03B 21/60* (2014.01)
  *G03B 21/62* (2014.01)
  *H04N 5/74* (2006.01)
  *B60J 1/02* (2006.01)
  *B60J 1/08* (2006.01)

(52) U.S. Cl.
  CPC .. *B32B 17/10761* (2013.01); *B32B 17/10935* (2013.01); *E06B 3/66* (2013.01); *E06B 3/70* (2013.01); *E06B 5/00* (2013.01); *G02B 5/02* (2013.01); *G02B 5/0242* (2013.01); *G02B 5/0257* (2013.01); *G03B 21/60* (2013.01); *G03B 21/62* (2013.01); *H04N 5/74* (2013.01); *B32B 2264/107* (2013.01); *B32B 2307/412* (2013.01); *B32B 2605/006* (2013.01); *B60J 1/02* (2013.01); *B60J 1/08* (2013.01)

(58) Field of Classification Search
  CPC .. B32B 2307/412; B32B 2551/00; B60J 1/00; B60J 1/001; B60J 1/02
  See application file for complete search history.

(56) References Cited

U.S. PATENT DOCUMENTS

| | | | |
|---|---|---|---|
| 6,579,608 B1 | 6/2003 | Kondo | |
| 6,673,456 B1 | 1/2004 | Kobata | |
| 2001/0005282 A1 | 6/2001 | Etori et al. | |
| 2001/0016261 A1 | 8/2001 | Kondo | |
| 2002/0027626 A1 | 3/2002 | Hiraishi et al. | |
| 2004/0075896 A1 | 4/2004 | Eckelt et al. | |
| 2004/0076203 A1* | 4/2004 | Kaminsky | G03B 21/56 372/39 |
| 2005/0142366 A1 | 6/2005 | Fugiel et al. | |
| 2006/0012876 A1 | 1/2006 | Choi | |
| 2008/0131704 A1* | 6/2008 | Mizuno | B32B 27/36 428/423.1 |
| 2009/0002817 A1* | 1/2009 | Harada | G02B 5/0242 359/453 |
| 2010/0009172 A1 | 1/2010 | Morikawa | |
| 2010/0221461 A1 | 9/2010 | Torr | |
| 2011/0111210 A1 | 5/2011 | Matsunami | |
| 2011/0300356 A1 | 12/2011 | Takamatsu | |
| 2015/0239023 A1 | 8/2015 | Iwata | |

FOREIGN PATENT DOCUMENTS

| | | |
|---|---|---|
| EP | 3 133 441 | 2/2017 |
| JP | 7-292155 | 11/1995 |
| JP | 8-259279 | 10/1996 |
| JP | 2001-1455 | 1/2001 |
| JP | 2004-517372 | 6/2004 |
| JP | 2005-52496 | 8/2005 |
| JP | 2006-503334 | 1/2006 |
| JP | 2006-146019 | 6/2006 |
| JP | 2006-244747 | 9/2006 |
| JP | 2007-57906 | 3/2007 |
| JP | 2008-195569 | 8/2008 |
| JP | 2011-113068 | 6/2011 |
| JP | 2013-92582 | 5/2013 |
| JP | 2013-171246 | 9/2013 |
| JP | 5365048 | 12/2013 |
| JP | 2014-137539 | 7/2014 |
| JP | 2014-149504 | 8/2014 |
| JP | 2014-153708 | 8/2014 |
| JP | 2015-102807 | 6/2015 |

OTHER PUBLICATIONS

Office Action dated Jul. 29, 2016 in corresponding Japanese patent application No. 2016-540064 with English translation.
International Preliminary Report on Patentability dated Sep. 12, 2017 in International Application No. PCT/JP2016/055942.
Extended European Search Report dated Jun. 1, 2018 in European Patent Application No. 16761537.6.
Office Action dated Nov. 5, 2018 in corresponding Chinese Patent Application No. 201680006294.6 with English translation.
Communication pursuant to Rule 114(2) EPC dated Oct. 8, 2019 in corresponding European Patent Application No. 16761537.6.
Office Action dated Aug. 26, 2019 in corresponding Chinese Patent Application No. 201680006294.6, with English Translation.
Office Action dated Dec. 13, 2019 in European Patent Application No. 16 761 537.6.

\* cited by examiner

SEE-THROUGH LAYERED BODY, TRANSPARENT SCREEN COMPRISING SAME, AND IMAGE PROJECTION DEVICE COMPRISING SAME

TECHNICAL FIELD

The present invention relates to a see-through layered body suitably used for a projection type image display transparent screen. Also, the present invention relates to a transparent screen comprising said see-through layered body and an image projection device comprising the same.

BACKGROUND ART

Conventionally, a layered body of a combined glass type has been used for a transparent member having durability. The combined glass type layered body is widely used as window glasses for vehicles such as cars, aircrafts and buildings since it is safe in that even though it is damaged by external impact, the glass debris resist shattering. For such combined glass type layered body, one is used which comprises an intermediate film for the combined glass in between at least one pair of glass. For the intermediate film for the combined glass, for example, a polyvinyl butyral intermediate film and an ethylene-vinyl acetate copolymer intermediate film are generally known, and a vinyl chloride resin intermediate film is also considered.

On one hand, there is a growing demand for displaying by projection, car navigation on window glass of vehicles such as cars and displaying by projection, merchandise information, advertisement, or the like on a shop window of a department store, or the like, or on a transparent partition of an event venue, or the like while maintaining the transparency thereof. However, no projector screens of a combined glass type existed, capable of visualizing the image which has been projected by a projector, while maintaining the safety and transparency as a combined glass type layered body.

However, since a conventional projector screen has a low transparency, there is a technical problem that such projector screen cannot be applied to a transparent partition, or the like. Therefore, various proposals have been made as below. There is proposed a screen having a concave portion on the surface as a projector screen (see Patent Document 1). A double face image film screen is proposed, comprising a transparent material of any one kind selected from the group of polyester, acryl, and polycarbonate; and a light refractive material of silica, contained in or coated on such transparent material, and characterized in removing a hot spot (see Patent Document 2). A transmission type screen layered body is proposed, which is capable of easily attaching a transmission type screen when attaching thereof by water to an attached substrate, such as a glass or a plastic board, and capable of peeling off a light diffusion layer from the attached substrate without any remainings thereof (see Patent Document 3). A transmission type screen is proposed, wherein a Fresnel lens sheet/a lenticular lens sheet/a light diffusion sheet are arranged in this order, wherein the light diffusion sheet is a combined glass having an intermediate resin film layer between two glass board-form bodies and the haze is from 15 to 80% (see Patent Document 4). A transmission type screen is proposed, comprising a transparent thin film layer comprising diamond microparticles with a median diameter of from 0.01 to 1 μm obtained by oxidation treatment of nanodiamonds having a graphite phase obtained from exposure method (see Patent Document 5). A transparent light diffusion body is proposed, containing a thin film (from 0.2 to 400 μm), which nanoparticles of a high refractive index are dispersed in a dispersion medium to obtain a highly transparent transmission type screen (see Patent Document 6).

RELATED ART DOCUMENTS

Patent Documents

Patent Document 1 Japanese Unexamined Patent Application Publication No. 2006-146019
Patent Document 2 Japanese Unexamined Patent Application Publication No. 2006-503334 Patent Document 3 Japanese Unexamined Patent Application Publication No. 2014-137539
Patent Document 4 Japanese Unexamined Patent Application Publication No. 2007-057906
Patent Document 5 Japanese Unexamined Patent Application Publication No. 2011-113068
Patent Document 6 Japanese Unexamined Patent Application Publication No. 2014-153708

SUMMARY OF THE INVENTION

Problems to be Solved by the Invention

However, the present inventors found the following technical problems in Patent Documents 1 to 6. When the screen as described in Patent Document 1 is applied to a shop window or a transparent partition of an event venue or the like, there is a technical problem that since the concave portion wears out along with usage, it is poor in image clarity and transparency, and that it is poor in durability, incapable of maintaining its property for a long period. The film screen as described in Patent Document 2 is clouded in order to remove the hot spot and has a technical problem that it has a low light transmittance, and poor image clarity and transparency. Also, the film screen as described in Patent Document 2 has a technical problem that it is poor in durability since a transparent material of any one kind selected from the group of polyester, acryl, and polycarbonate is used. The transmission type screen layered body as described in Patent Document 3 has a technical problem that it is poor in image clarity and transparency since it comprises a sticking layer planned to be stuck on a substrate such as glass. The transmission type screen lens sheet as described in Patent Document 4 has a technical problem that it is poor in image clarity and transparency since a lens sheet it disposed on a combined glass. The nanodiamond particles used for the transparent screen as described in Patent Document 5 require many treatment steps and thus there is a technical problem of poor production efficiency and production cost. In paragraph [0113] of Patent Document 5, a transmission screen of a combined glass type is described; however the center plane average roughness SRa of the glass substrate is not considered, and therefore, a transmission type screen having sufficient image clarity and transparency cannot be obtained. Since the light scattering intensity of the high refractive particles is too large in the transparent light diffusion body as described in Patent Document 6, it has a technical problem that a screen having high image clarity and transparency is difficult to be made.

Means for Solving the Problems

The present invention has been made in view of the above described technical problems, and an object of the present invention is to provide a see-through layered body which allows obtaining a projection type image display transparent screen with a wide viewing angle, and excellent image clarity and transparency. Additionally, the object of present invention is to provide a transparent screen comprising said see-through layered body, or an image projection device comprising said see-through layered body and a projection device.

In order to solve the above described technical problems, the present inventors intensively studied to find that, in a see-through layered body (a combined glass type layered body) comprising an intermediate resin film and two transparent substrates holding the intermediate resin film, the above described technical problems can be solved when a certain amount of microparticles of a certain average diameter is contained in the intermediate resin film and the center plane average roughness SRa of the transparent substrate which is to be the outermost surface of the layered body, is adjusted within a certain range.

That is, according to one aspect of the present invention, there is provided a see-through layered body comprising an intermediate resin film and two transparent substrates holding said intermediate resin film, wherein said intermediate resin film comprises a resin and from 0.0001 to 15% by mass of microparticles based on said resin, having an average diameter of from 1 nm to 100 μm; and the center plane average roughness SRa of outermost surfaces on both sides of said layered body is from 0.05 to 5.5 nm.

According to one aspect of the present invention, the microparticles are preferably selected from the group consisting of zirconium oxide, titanium oxide, aluminum oxide, magnesium oxide, cerium oxide, barium titanate, barium sulfate, calcium carbonate, silica, aluminum, silver, platinum, gold, titanium, nickel, tin, indium, diamond, tin-cobalt alloy, zinc sulfide, metal-coated mica, metal-coated glass, acrylic beads, and styrene beads.

According to one aspect of the present invention, preferably, the microparticles have a content of from 0.001 to 2% by mass based on the resin and an average diameter of from 10 nm to 5 μm.

According to one aspect of the present invention, the total light transmittance of the layered body is preferably 65% or higher.

According to one aspect of the present invention, the haze value of the layered body is preferably 35% or less.

According to one aspect of the present invention, the image clarity of the layered body is preferably 70% or higher.

According to one aspect of the present invention, the thickness of the layered body is preferably from 10 μm to 100 mm.

According to one aspect of the present invention, the layered body preferably further comprises a transparent substrate.

In another aspect of the present invention, there is provided a see-through intermediate resin film used for the above described see-through layered body, wherein the image clarity of said intermediate resin film is 50% or higher.

In another aspect of the present invention, there is provided a member for a vehicle, comprising the above described see-through layered body.

In another aspect of the present invention, there is provided a member for a house, comprising the above described see-through layered body.

In another aspect of the present invention, there is provided a reflection type transparent screen, comprising the above described see-through layered body.

In another aspect of the present invention, there is provided a transmission type transparent screen, comprising the above described see-through layered body.

In another aspect of the present invention, there is provided an image projection device comprising the above described see-through layered body and a projection device.

Effects of the Invention

The see-through layered body according to the present invention is capable of providing a projection type image display transparent screen with a wide viewing angle, and excellent image clarity and transparency.

MODE FOR CARRYING OUT THE INVENTION

<See-Through Layered Body>

A see-through layered body according to the present invention comprises an intermediate resin film and two transparent substrates holding the intermediate resin film. Such layered body can be suitably used as a transparent screen and can provide a clear image on the layered body without compromising the image clarity and transparency. The intermediate resin film having a light diffusion function is held by two transparent substrates and is not exposed to the external. Therefore, it is less affected by the external which results in excellent durability of the layered body. Additionally, such layered body may further comprise other layers such as a reflection protection layer, as long as the image clarity and transparency are not compromised.

Figure 1:
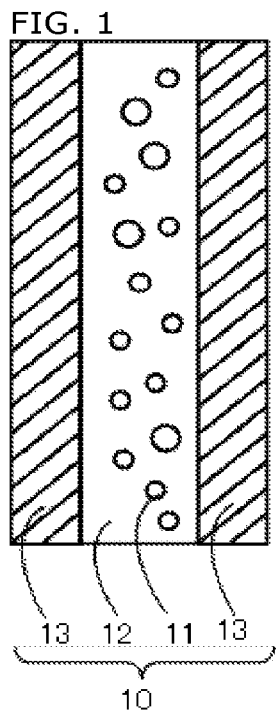
FIG. 1 is a cross-sectional schematic diagram in the thickness direction of one embodiment of a see-through layered body according to the present invention.

FIG. 1 is a cross-sectional schematic diagram in the thickness direction, illustrating one embodiment of a see-through layered body according to the present invention. The see-through layered body 10 comprises an intermediate resin film 12, in which microparticles 11 are dispersed in the resin, and two transparent substrates 13 holding the intermediate resin film 12.

The see-through layered body according to the present invention can be used directly as a transparent screen. Since the transmission visibility of the transparent screen is required not to be compromised, the layered body preferably has a high transmittance of visible light, and high image clarity and transparency. In the present invention, the term "transparent" means transparent in the degree that a transmission visibility depending on the applications is attained and also includes being translucent.

The total light transmittance of the layered body is preferably 65% or higher, more preferably 70% or higher, still preferably 80% or higher, and still more preferably 85% or higher. The haze value of the layered body is preferably 35% or less, more preferably from 1 to 25%, more preferably from 1.5 to 20%, still more preferably from 2 to 15%, and especially preferably from 2.5 to 10%. When the total light transmittance and the haze value of the layered body are within the above-mentioned ranges, the transparency will be high and the transmission visibility can be more improved. In the present invention, the total light transmittance and the haze value of the layered body can be measured in accordance with JIS-K-7361 and JIS-K-7136.

The image clarity of the layered body is preferably 70% or higher, more preferably 75% or higher, still preferably 80% or higher, still more preferably 85% or higher, and especially preferably 90% or higher. When the image clarity of the layered body is within the above range, the transmitted image to be seen will be extremely clear. In the present invention, the image clarity is a value of image definition (%) when measured with an optical comb having a width of 0.125 mm in accordance with JIS K7374.

In view of durability, application, productivity, handling, and transportation, the thickness of the layered body is preferably from 10 µm to 100 mm (100000 µm), more preferably from 50 µm to 50 mm (50000 µm), and still preferably from 100 µm to 10 mm (10000 µm). In the present invention, "the see-through layered body" contains moldings of various types such as films, sheets, or plates (board-like moldings).

(Intermediate Resin Film)

The intermediate resin film can be seen through and comprises a resin and microparticles dispersed therein. When the layered body is used as a transparent screen, the intermediate resin film having a light diffusion function sufficiently diffuses anisotropically a projected light emitted from the projection device, which will enable to satisfy both visibilities of a diffused light and a transmitted light.

The thickness of the intermediate resin film is preferably from 5 µm to 1 mm (1000 µm), more preferably from 10 µm to 800 µm, still preferably from 20 µm to 500 µm, and still more preferably from 50 µm to 300 µm. When the thickness of the intermediate resin film is within the above described ranges, both the visibilities of the diffused light and the transmitted light can be satisfied by sufficiently diffusing anisotropically the projected light emitted from the projection device while ensuring the transparency of the intermediate resin film.

(Resin)

As a resin forming the intermediate resin film, a highly transparent resin is preferably used in order to obtain a see-through layered body. For a highly transparent resin, a thermoplastic resin such as an acrylic resin, an acrylic urethane resin, a polyester acrylate resin, a polyurethane acrylate resin, an epoxy acrylate resin, a polyester resin, a polyolefin resin, a urethane resin, an epoxy resin, a polycarbonate resin, a cellulose resin, an acetal resin, a vinyl resin, a polystyrene resin, a polyamide resin, a polyimide resin, a melamine resin, a phenol resin, a silicone resin, a polyarylate resin, a polyvinyl alcohol resin, a polyvinyl chloride resin, a poly sulfone resin, and a fluorocarbon resin; a thermoset resin; an ionizing radiation-curable resin; or the like can be used. Among these, a thermoplastic resin is preferably used in view of formability of the intermediate resin film but without specific limitation. As thermoplastic resins, preferably, an acrylic resin, a polyester resin, a polyolefin resin, a vinyl resin, a polycarbonate resin, and a polystyrene resin are used, and more preferably, a polymethyl methacrylate resin, a polyethylene terephthalate resin, a polyethylene naphthalate resin, a polypropylene resin, a cycloolefin polymer resin, a cellulose acetate propionate resin, a polyvinyl butyral resin, a polycarbonate resin, and a polystyrene resin are used. These resins may be used singly, or in combination of two or more kinds thereof. The ionizing radiation-curable resin includes an acrylic resin, a urethane resin, an acrylic urethane resin, an epoxy resin, and a silicone resin. Among these, those having an acrylate functional group, for example, those containing a relatively high amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight are preferable. The ionizing radiation-curable resin may be obtained by mixing a thermoplastic resin and a solvent. The thermoset resin includes a phenol resin, an epoxy resin, a silicone resin, a melamine resin, a urethane resin, and a urea resin. Among these, an epoxy resin and a silicone resin are preferable.

(Microparticles)

As microparticles forming the intermediate resin film, an inorganic or an organic matter that can be atomized in a nano or a micron size may be suitably used. The shape of the microparticles is not particularly limited and those of sphere form, flat shape form, cube, cuboid, flake form, and amorphous form can be used. The average diameter of the microparticles is from 0.1 nm to 100 µm, preferably from 1 nm to 50 µm, still preferably from 5 nm to 20 µm, still more preferably from 10 nm to 10 µm, and especially preferably from 50 nm to 5 µm. When the microparticles are in flake form, the average aspect ratio (=average diameter/average thickness of the flake form microparticles) is preferably from 3 to 800, more preferably from 4 to 700, still preferably from 5 to 600, and still more preferably from 10 to 500. When the average diameter and the average aspect ratio are within the above described ranges, and the layered body is used for the transparent screen, a sufficient scattering effect of the projection light can be obtained without compromising the transmission visibility, thus a clear image can be projected. In the present invention, the average diameter of the microparticles was measured using a laser diffraction particle size distribution measuring device (Part No.: SALD-2300; manufactured by Shimadzu Corporation). In addition, the average aspect ratio of the microparticles was calculated from an SEM (Trade Name: SU-1500; manufactured by Hitachi High Technologies Corporation) image.

As for the microparticles, those by atomizing inorganic matters such as zirconium oxide, titanium oxide, aluminum oxide, magnesium oxide, cerium oxide, barium titanate, calcium carbonate, silica, and diamond, those by atomizing brilliant materials of inorganic matters such as aluminum, silver, platinum, gold, titanium, nickel, tin, indium, tin-cobalt alloy, zinc sulfide, metal-coated mica, and metal-coated glass, and those by atomizing organic matters such as acrylic resin beads and styrene resin beads may be used. One kind of these microparticles may be used singularly or two kinds may be combined and used. Those commercially available may be used for these microparticles.

The content of microparticles in the intermediate resin film is from 0.0001 to 15% by mass, preferably from 0.001 to 3% by mass, more preferably from 0.0015 to 2% by mass, still preferably from 0.002 to 1% by mass, still more preferably from 0.003 to 0.5% by mass, and especially preferably from 0.004 to 0.2% by mass, based on the resin. When the content of the microparticles in the intermediate resin film is within the above range, both the visibilities of diffused light and transmitted light are satisfied by sufficiently diffusing anisotropically the projected light emitted from the projection device while ensuring the transparency of in the intermediate resin film.

(Additives)

Conventionally known additives may be added to the intermediate resin film as long as the transmission visibility or the desired optical performance of the layered body is not compromised. Examples of the additives include an antioxidant, a lubricant, an ultraviolet absorber, a dispersing agent, a dye, a compatibilizer, a nucleating agent, and a stabilizer.

(Transparent Substrate)

The two transparent substrates constructing the layered body support the intermediate resin film and are positioned at the surface side of the layered body. The center plane average roughness SRa of the outermost surfaces on both sides of the layered body (when the transparent substrate is the outermost surface, then the face of the outermost surface side of the transparent substrate) is from 0.05 to 5.5 nm, preferably from 0.05 to 5.0 nm, more preferably from 0.05 to 4.5 nm, still preferably from 0.05 to 2.5 nm, and still more preferably from 0.05 to 1.0 nm. When the transparent screen is used with the center plane average roughness SRa of the outermost surfaces on both sides of the layered body set within the above described range, high image clarity can be achieved since the surface is smooth. The center plane average roughness SRa can be measured by using a surface micro figure measuring device, for example, Part No. SURFCORDER ET 4000A, manufactured by Kosaka Laboratory Ltd. In the present invention, a smooth surface can be achieved, by holding the intermediate resin film with transparent substrates having an extremely smooth surface, which is difficult to be obtained when the intermediate resin film such as a resin molding or an injection molding board is directly used as the transparent screen.

Other than the two transparent substrates holding the intermediate resin film, the layered body may further comprise a transparent substrate through an adhesive layer on the transparent substrate, if necessary. In the present invention, a layered body further comprising a transparent substrate (a multilayered combined glass type layered body) may be appropriately used, in view of durability, application, productivity, handling, and transportation.

The kind of transparent substrate is not particularly limited but preferably, glass, a polycarbonate based resin or a polyester based resin, a resin board or the like, consisting of a transparent resin such as an acrylic based resin is used, in view of durability, application, productivity, handling, and transportation.

In view of durability, application, productivity, handling, and transportation, the thickness of the transparent substrate is preferably from 5 μm to 50 mm (50000 μm), preferably from 50 μm to 20 mm (20000 μm), and still preferably from 50 μm to 10 mm (10000 μm).

(Other Resin Films)

The layered body may further comprise other films in between the intermediate resin film and the two transparent substrates holding the intermediate resin film. For example, the layer construction of the layered body can be of a transparent substrate/other resin film/an intermediate resin film/other resin film/a transparent substrate. The other resin film can serve a function as an adhesive layer or a sticking layer for improving the adhesion between the transparent substrates and the intermediate resin film. For the resins forming the other resin films, for example, a polyvinyl butyral resin or an ethylene-vinyl acetate copolymer resin may be suitably used. Similar resins to those forming the intermediate resin film as mentioned above may also be used. The kind of resins for the other resin films may be the same as, or may be different from the kind of resin of the intermediate resin film.

(Reflection Protection Layer)

A reflection protection layer is a layer for preventing a reflection or a reflection of an external light on the outermost surface of the layered body. The reflection protection layer may be layered on the surface side of the layered body (the viewer side), or may be layered on both faces. Especially when such layered body is used as a transparent screen, the reflection protection layer is preferably layered on the viewer side. The reflection protection layer is preferably formed by using a resin which does not compromise the transmission visibility or a desired optical property of the layered body. For such a resin, for example, a resin cured by an ultraviolet light/electron beam, i.e., an ionizing radiation-curable resin, those obtained by mixing a thermoplastic resin and a solvent to an ionizing radiation-curable resin, and a thermoset resin can be used. Among these, an ionizing radiation-curable resin is particularly preferable.

A method for forming the reflection protection layer is not particularly limited, and a dry coating method such as pasting of a coating film, or direct deposition or sputtering on a film substrate; and a wet coating treatment method such as gravure coating, microgravure coating, bar coating, slide die coating, slot-die coating, and dip coating may be used.

<Method for Manufacturing Layered Body>

The method for manufacturing a layered body according to the present invention comprises a process for forming an intermediate resin layer and a process for holding the intermediate resin film by two transparent substrates. In the process for forming the intermediate resin film, the intermediate resin film may be molded and processed according to known methods such as extrusion molding comprising kneading and film manufacturing process, injection molding, calendering molding, blow molding, compression molding, and casting. In view of the wide range of the film thickness that can be manufactured, extrusion molding method can be suitably used. Also, in view of formability of the thick film sheet, injection molding method can be suitably used. In the following, each process of the manufacturing method will be described in details.

(Kneading Process)

A kneading process is a process where, using a kneading extruder, the above described resin and microparticles are kneaded to obtain a resin composition. For the kneading extruder, there are a single- and a twin-screw kneading extruder, and either can be used. When a twin-screw kneading extruder is used, preferably, the resin and the microparticles as described above are kneaded while applying a shear stress, preferably from 3 to 1,800 KPa, more preferably from 6 to 1,400 KPa on average over the whole length of a screw of the twin-screw kneading extruder to obtain a resin composition. When the shear stress is within the above described range, the microparticles can be sufficiently dispersed in the resin. In particular, when the shear stress is 3 KPa or higher, the dispersion homogeneity of the microparticles can be more improved, and when the shear stress is 1,800 KPa or less, degradation of the resin is prevented, thereby preventing contamination of an air bubble in the intermediate resin film. The shear stress can be set in a desired range by regulating the twin-screw kneading extruder. In the present invention, a resin (master batch) to which microparticles are added in advance and a resin to which microparticles are not added may be mixed together to be kneaded by a twin-screw kneading extruder, thereby obtaining a resin composition. The above description is one example of a kneading process, and a resin (mater batch) to which microparticles are added in advance may be prepared by a single-screw kneading extruder, or a master batch may be prepared by using a commonly known dispersing agent.

To the resin composition, other than the resin and the microparticles, conventionally known additives may be added as long as the transmission visibility or a desired optical performance of the layered body is not compromised. Examples of the additives include an antioxidant, a lubricant, an ultraviolet absorber, a dispersing agent, a dye, a compatibilizer, a nucleating agent, and a stabilizer. The resin and the microparticles are as described above.

A twin-screw kneading extruder used in the kneading process comprises a cylinder and two screws therein and is configured by combining screw elements. For the screw, a flight screw at least including a conveying element and a kneading element is suitably used. The kneading element preferably includes at least one selected from the group consisting of a kneading element, a mixing element, and a rotary element. By using such flight screw including a kneading element, the microparticles can be sufficiently dispersed in the resin while applying a desired shear stress.

(Film Manufacturing Process)

A film manufacturing process is a process in which a film is made of the resin composition obtained in the kneading process. A film manufacturing method is not particularly limited, and a film consisted of a resin composition can be made by a conventionally known method. For example, the resin composition obtained in the kneading process is provided to a melt extruder heated to a temperature (from Tm to Tm+70° C.) of the melting point or higher to melt the resin composition. For the melt extruder, a single-screw extruder, a twin-screw extruder, a vent extruder, or a tandem extruder can be used depending on the purposes.

Subsequently, the molten resin composition is, for example, extruded into a sheet form by a die such as a T-die, and the extruded sheet-form article is rapidly quenched and solidified by a revolving cooling drum or the like, thereby forming a film. When the film manufacturing process is performed continuously with the above described kneading process, the resin composition obtained in the kneading process in a molten state may be directly extruded to a sheet form from a die to form a film-shaped intermediate resin film.

The intermediate resin film in a film shape obtained in the film manufacturing process can be further uniaxially or biaxially stretched by a conventionally known method. Stretching of the above described intermediate resin film can improve its strength.

(Holding Process)

The holding process is a process to hold the intermediate resin film obtained as described above, by two transparent substrates. For example, the intermediate resin film is cut into a required size and put in to a nylon bag equipped with a tube connected to a vacuum pump, in a state being held by the transparent substrates. The nylon bag is put into an autoclave and then heated at a temperature higher than the glass transition temperature of the resin forming the intermediate resin film, with the inside of the nylon bag set to a vacuum state. A temporary adhered layered body can be obtained by heating in vacuum. The temporary adhered layered body is put into the autoclave again and heated at a temperature higher than the softening temperature of the resin forming the intermediate resin film, with applying pressure. A completely adhered layered body can be obtained after the temperature has decreased.

<Member for Vehicle>

A member for a vehicle according to the present invention comprises the see-through layered body as described above. The member for a vehicle may be constituted only by the above described see-through layered body, or may further comprise a reflection protection layer or the like. The member for a vehicle includes a windshield or a side glass. When the member for a vehicle comprises the see-through layered body as described above, a clear image can be displayed on the member for a vehicle without providing a separate screen.

<Member for House>

A member for a house according to the present invention comprises the see-through layered body as described above. The member for a house may be consisted of only the above described see-through layered body, or may further comprise a reflection protection layer or the like. The member for a house includes a window glass for a house, a glass wall for a convenient store or a shop along the street. When the member for a house comprises the see-through layered body as described above, a clear image can be displayed on the member for a house without providing a separate screen.

<Transparent Screen>

The transparent screen according to the present invention comprises the above described see-through layered body. The transparent screen may be consisted of only the above described see-through layered body, or may further comprise a reflection protection layer or the like.

The transparent screen may be a rear projection type screen (a transmission type screen) or a front projection type screen (a reflection type screen). That is to say, in the image display device comprising the transparent screen according to the present invention, the position of a light source may be at the viewer side against the screen or may be at the opposite side of the viewer.

<Image Projection Device>

The image projection device according to the present invention comprises the above described see-through layered body and a projection device. The projection device is not particularly limited, as long as it is capable of projecting an image onto a screen, and for example, commercially available rear or front projectors can be used.

Figure 2:
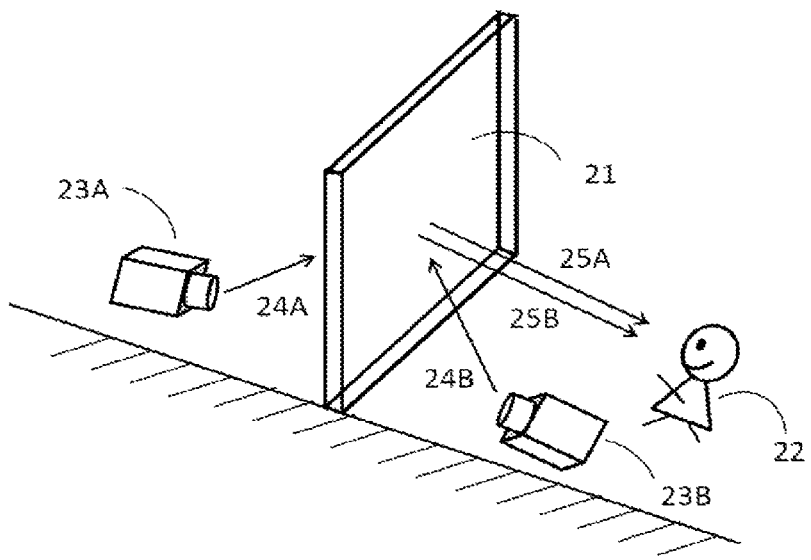
FIG. 2 is a schematic diagram showing of one embodiment of a transparent screen and an image projection device according to the present invention.

FIG. 2 is a schematic diagram illustrating one embodiment of the transparent screen and the image projection device according to the present invention. For a transparent screen 21, the see-through layered body 10 as illustrated in FIG. 1 can be directly used. In case of a rear projection type screen, the image projection device comprises the transparent screen 21 and a projection device 23A, set at the opposite side (rear side) of a viewer 22 against the transparent screen 21. A projection light 24A emitted from the projection device 23A enters from the rear side of the transparent screen 21 and diffuses anisotropically by the transparent screen 21, whereby the viewer 22 can visually recognize a diffused light 25A. In case of a front projection type screen, the image projection device comprises the transparent screen 21 and a projection device 23B, set at the same side (front side) of the viewer 22 against the transparent screen 21. A projection light 24B emitted from the projection device 23B enters from the front side of the transparent screen 21 and diffuses anisotropically by the transparent screen 21, whereby the viewer 22 can visually recognize a diffused light 25B.

EXAMPLES

In the following, the present invention will be more specifically described with reference to Examples and Comparative Examples, but the present invention should not be construed to be limited to the following Examples.

The measuring methods of various physicalities and performance evaluation in the Examples and the Comparative Examples are as follows.

(1) Average Diameter

Average diameter was measured by using a laser diffraction particle size distribution measuring device (Part No., SALD-2300; manufactured by Shimadzu Corporation).

(2) Center Plane Average Roughness SRa

Center plane average roughness SRa was measured by using a surface micro figure measuring device (Part No. SURFCORDER ET 4000A; manufactured by Kosaka Laboratory Ltd.).

(3) Total Light Transmittance

Total light transmittance was measured by using a turbidimeter (Part No.: NDH-5000; manufactured by NIPPON DENSHOKU INDUSTRIES CO., LTD.) in accordance with JIS K7361-1.

(4) Haze

Haze was measured by using a turbidimeter (Part No.: NDH-5000; manufactured by NIPPON DENSHOKU INDUSTRIES CO., LTD.) in accordance with JIS K7136.

(5) Image Clarity

Image clarity is a value of image definition (%) when measured by using an image clarity measuring device (Part No.: ICM-IT; manufactured by Suga Test Instruments Co., Ltd.), with an optical comb having a width of 0.125 mm in accordance with JIS K7374. The larger the value of the definition, the higher is the transmission image clarity.

(6) Transparency

Transparency of the layered bodies prepared below was visually evaluated based on the following criteria.

[Evaluation Criteria]

◯: Excellent transparency x: Poor transparency (7) Image Sharpness

An image was projected on the layered body made as a transparent screen as described below by using a mobile LED mini projector PP-D1S, manufactured by Onkyo Digital Solutions Corporation, from a position 50 cm away in an angle of 15 degrees against a normal line direction. Then, after adjusting a focus knob of the projector to bring focus on the screen surface, the image displayed on the screen was visually evaluated from 2 places: 1 m frontward from the screen (the same side as the projector against the screen; so-called a front projection); and 1 m backward from the screen (the opposite side of the projector against the screen; so-called a rear projection), under the following evaluation criteria. Performance as a reflection type screen can be evaluated by observing from the front of the screen and performance as a transmission type screen can be evaluated by observing from the back of the screen.

[Evaluation Criteria]

⊚: A significantly clear image was visualized

◯: A clear image was visualized x: An image was not visualized x: An image was not visualized (8) Viewing Angle Viewing angle was measured by using a goniophotometer (Part No.: GC5000L; manufactured by NIPPON DENSHOKU INDUSTRIES CO., LTD.). An entering angle of a light source was set to 0 degree, and a transmitted light intensity in the direction of 0 degree with nothing placed on the measuring stage was 100. When a sample was measured, the transmitted light intensity was measured by 1 degree from −85 degrees to +85 degrees with the entering angle of the light source kept at 0 degree. Among the measured range, the range having the transmitted light intensity of 0.001 or higher was the viewing angle.

Example 1

(1) Manufacturing Process of an Intermediate Resin Film (Kneading Process/Film Manufacturing Process)

100 parts by mass of polyvinyl butyral powder (Trade Name: Mowital B30H; manufactured by Kuraray Co., Ltd.) and 0.3 part by mass of zirconium oxide powder (average diameter: 11 nm; manufactured by Kanto Denka Kogyo Co., Ltd.) were mixed homogeneously. The mixed powders were introduced into a hopper of a twin-screw kneading extruder (manufactured by TECHNOVEL CORPORATION) equipped with a T-die and were extruded at 180° C. to obtain an intermediate resin film in a thickness of 100 μm. The center plane average roughness (SRa) in the range of 5 mm×5 mm of the intermediate resin film was measured and resulted to be 5.8 nm, and the image clarity was 66%.

(2) Manufacturing Process of a Layered Body (Holding Process)

The obtained intermediate resin film was cut into 12 cm×12 cm and subsequently held by two glass substrates (SRa: 0.45 nm; thickness: 2 mm). Then, it was put into a nylon bag and heated for 2 hours at a temperature higher than the glass transition temperature of the polyvinyl butyral (PVB) (80° C. in the present Example) in an autoclave of a normal pressure, with the inside of the bag set to vacuum by a vacuum pump. Then, the temporary adhered combined glass type layered body was removed from the bag and it was heated for 2 hours at a temperature higher than the softening temperature of the PVB resin (160° C.) in the autoclave of pressure at 8 kg/cm² to obtain a completely adhered layered body.

(3) Evaluation of Transparent Screen

When the obtained layered body was directly used as a transparent screen, the total light transmittance was 89%, the haze value was 14%, and the transparency was sufficient. The image clarity was 94% and the transmitted image to be seen was extremely clear. Further, the image sharpness was visually evaluated, whereby the image was clearly visualized by observing both from the front and the back. Especially, an extremely clear image was visualized by observing from the back. The viewing angle measured by a goniophotometer was ±24 degrees, which was found to result in excellent viewing angle property.

Example 2

A layered body was manufactured in the same manner as Example 1, except that two glass substrates (SRa: 0.06 nm; thickness: 2 mm) were used in the (2) manufacturing process of the layered body.

When the obtained layered body was directly used as a transparent screen, the total light transmittance was 89%, the haze value was 13%, and the transparency was sufficient. The image clarity was 96% and the transmitted image to be seen was extremely clear. Further, the image sharpness was visually evaluated, whereby the image was clearly visualized by observing both from the front and the back. Especially, an extremely clear image was visualized by observing from the back. The viewing angle measured by a goniophotometer was ±23 degrees, which was found to result in excellent viewing angle property.

Example 3

A layered body was manufactured in the same manner as Example 1, except that two glass substrates (SRa: 2.5 nm; thickness: 2 mm) were used in the (2) manufacturing process of the layered body.

When the obtained layered body was directly used as a transparent screen, the total light transmittance was 89%, the haze value was 14%, and the transparency was sufficient. The image clarity was 90% and the transmitted image to be seen was extremely clear. Further, the image sharpness was visually evaluated, whereby the image was clearly visualized by observing both from the front and the back. Especially, an extremely clear image was visualized by observing from the back. The viewing angle measured by a goniophotometer was ±24 degrees, which was found to result in excellent viewing angle property.

Example 4

A layered body was manufactured in the same manner as Example 1, except that two glass substrates (SRa: 4.5 nm; thickness: 2 mm) were used in the (2) manufacturing process of the layered body.

When the obtained layered body was directly used as a transparent screen, the total light transmittance was 89%, the haze value was 14%, and the transparency was sufficient. The image clarity was 81% and the transmitted image to be seen was clear. Further, the image sharpness was visually evaluated, whereby the image was clearly visualized by observing both from the front and the back. Especially, an extremely clear image was visualized by observing from the back. The viewing angle measured by a goniophotometer was ±24 degrees, which was found to result in excellent viewing angle property.

Example 5

An intermediate resin film was manufactured in the same manner as Example 1, except that 14 parts by mass of dry type silica particles (Trade Name: NHM-4N; hydrophobic; average diameter: 90 nm; manufactured by Tokuyama Corporation) were added as microparticles and the thickness of the intermediate resin film was changed to 50 µm in the (1) manufacturing process of the intermediate resin film. The center plane average roughness (SRa) in the range of 5 mm×5 mm of the intermediate resin film was measured and resulted to be 6.2 nm, and the image clarity was 55%. Subsequently, a layered body was manufactured in the same manner as Example 1.

When the obtained layered body was directly used as a transparent screen, the total light transmittance was 89%, the haze value was 31%, and the transparency was sufficient. The image clarity was 88% and the transmitted image to be seen was clear. Further, the image sharpness was visually evaluated, whereby the image was clearly visualized by observing both from the front and the back. Especially, an extremely clear image was visualized by observing from the back. The viewing angle measured by a goniophotometer was ±31 degrees, which was found to result in excellent viewing angle property.

Example 6

An intermediate resin film was manufactured in the same manner as Example 1, except that 0.008 part by mass of flake-form aluminum microparticles (average diameter: 10 µm; aspect ratio: 300) having brilliance were added as microparticles in the (1) manufacturing process of the intermediate resin film. The center plane average roughness (SRa) in the range of 5 mm×5 mm of the intermediate resin film was measured and resulted to be 5.4 nm, and the image clarity was 70%. Subsequently, a layered body was manufactured in the same manner as Example 1.

When the obtained layered body was directly used as a transparent screen, the total light transmittance was 87%, the haze value was 4.3%, and the transparency was sufficient. The image clarity was 94% and the transmitted image to be seen was clear. Further, the image sharpness was visually evaluated, whereby the image was clearly visualized by observing both from the front and the back. Especially, an extremely clear image was visualized by observing from the front. The viewing angle measured by a goniophotometer was ±15 degrees, which was found to result in excellent viewing angle property.

Example 7

An intermediate resin film was manufactured in the same manner as Example 1, except that 0.04 part by mass of flake-form aluminum microparticles (average diameter: 10 µm; aspect ratio: 300) having brilliance were added as microparticles in the (1) manufacturing process of the intermediate resin film. The center plane average roughness (SRa) in the range of 5 mm×5 mm of the intermediate resin film was measured and resulted to be 5.6 nm, and the image clarity was 69%. Subsequently, a layered body was manufactured in the same manner as Example 1.

When the obtained layered body was directly used as a transparent screen, the total light transmittance was 70%, the haze value was 17%, and the transparency was sufficient. The image clarity was 94% and the transmitted image to be seen was clear. Further, the image sharpness was visually evaluated, whereby the image was extremely clearly visualized by observing both from the front and the back. The viewing angle measured by a goniophotometer was ±25 degrees, which was found to result in excellent viewing angle property.

Example 8

An intermediate resin film was manufactured in the same manner as Example 1, except that 0.15 part by mass of zirconium oxide powder (average diameter: 11 nm; manufactured by Kanto Denka Kogyo Co., Ltd.) and 0.008 part by mass of flake-form aluminum microparticles (average diameter: 10 µm; aspect ratio: 300) having brilliance were added as microparticles in the (1) manufacturing process of the intermediate resin film. The center plane average roughness (SRa) in the range of 5 mm×5 mm of the intermediate resin film was measured and resulted to be 5.6 nm, and the image clarity was 68%. Subsequently, a layered body was manufactured in the same manner as Example 1.

When the obtained layered body was directly used as a transparent screen, the total light transmittance was 86%, the haze value was 12%, and the transparency was sufficient. The image clarity was 94% and the transmitted image to be seen was clear. Further, the image sharpness was visually evaluated, whereby the image was extremely clearly visualized by observing both from the front and the back. The viewing angle measured by a goniophotometer was ±23 degrees, which was found to result in excellent viewing angle property.

Example 9

An intermediate resin film was manufactured in the same manner as Example 1, except that 0.003 part by mass of flake-form aluminum microparticles (average diameter: 1 μm; aspect ratio: 300) having brilliance were added as microparticles in the (1) manufacturing process of the intermediate resin film. The center plane average roughness (SRa) in the range of 5 mm×5 mm of the intermediate resin film was measured and resulted to be 5.2 nm, and the image clarity was 72%. Subsequently, a layered body was manufactured in the same manner as Example 1.

When the obtained layered body was directly used as a transparent screen, the total light transmittance was 89%, the haze value was 3.5%, and the transparency was sufficient. The image clarity was 94% and the transmitted image to be seen was extremely clear. Further, the image sharpness was visually evaluated, whereby the image was clearly visualized by observing both from the front and the back. Especially, an extremely clear image was visualized by observing from the front. The viewing angle measured by a goniophotometer was ±14 degrees, which was found to result in excellent viewing angle property.

Example 10

(1) Manufacturing Process of an Intermediate Resin Film (Kneading Process/Film Manufacturing Process)

An intermediate resin film was manufactured in the same manner as Example 1, except that a polyethylene terephthalate resin (Trade Name: IFG8L; manufactured by Bell Polyester Products, Inc.) was used instead of a polyvinyl butyral resin, the added amount of the zirconium oxide powder was changed to 0.1 part by mass, and the extrusion temperature was changed to 250° C. in the manufacturing process of the intermediate resin film. The center plane average roughness (SRa) in the range of 5 mm×5 mm of the intermediate resin film was measured and resulted to be 4.8 nm, and the image clarity was 77%.

(2) Manufacturing Process of a Layered Body (Holding Process)

Subsequently, PVB resin powder (Trade Name: Mowital B30H; manufactured by Kuraray Co., Ltd.) was introduced into a hopper of a twin-screw kneading extruder (manufactured by TECHNOVEL CORPORATION) equipped with a T-die and were extruded at 180° C. to obtain another resin film (a PVB resin film) in a thickness of 100 μm. The obtained PVB resin film and the intermediate resin film were cut into 12 cm×12 cm and a layered body layered in the order from a PVB resin film/an intermediate resin film/a PVB resin film was held by two glass substrates (SRa: 0.45 nm; thickness: 2 mm). Subsequently, it was put into a nylon bag and was heated for 2 hours at a temperature higher than the glass transition temperature of the PVB resin (80° C. in the present Example) in an autoclave of a normal pressure, with the inside of the bag set to vacuum by a vacuum pump. Then, the temporary adhered combined glass type layered body was removed from the bag and heated for 2 hours at a temperature higher than the softening temperature of the PVB resin (160° C.) in the autoclave at a pressure of 8 kg/cm² to manufacture a completely adhered layered body.

(3) Evaluation of a Transparent Screen

When the obtained layered body was directly used as a transparent screen, the total light transmittance was 88%, the haze value was 6.9%, and the transparency was sufficient. The image clarity was 94% and the transmitted image to be seen was extremely clear. Further, the image sharpness was visually evaluated, whereby the image was clearly visualized by observing both from the front and the back. Especially, an extremely clear image was visualized by observing from the back. The viewing angle measured by a goniophotometer was ±23 degrees, which was found to result in excellent viewing angle property.

Comparative Example 1

A layered body was manufactured by adhering the intermediate resin film obtained from Example 1, to one surface of one glass substrate (SRa: 2.5 nm; thickness: 2 mm) at room temperature of 25° C. by using an acrylic resin based adhesive in the (2) manufacturing process of the layered body.

When the obtained layered body was directly used as a transparent screen, the total light transmittance was 89%, the haze value was 14%, and the transparency was sufficient. Further, the image sharpness was visually evaluated, whereby the image was clearly visualized by observing both from the front and the back. The viewing angle measured by a goniophotometer was ±24 degrees, which was found to result in excellent viewing angle. However, the image clarity was 65%, and when the letters of the background were seen through the screen, they were distorted and difficult to be read. Since the intermediate resin film existed at the outermost layer, the surface roughness SRa of one side of this screen was 5.8 nm. It was identified that the screen with the glass substrates holding the intermediate resin film, like Example 1, have excellent image clarity as the interface and the surface can be made smooth; however the image clarity decreases with the externally attached screen since the surface is rough.

Comparative Example 2

100 parts by mass of a PET pellet (Trade Name: IP121B; manufactured by Bell Polyester Products, Inc.) and 0.3 part by mass of zirconium oxide powder (average diameter: 11 nm; manufactured by Kanto Denka Kogyo Co., Ltd.) were mixed homogeneously in the (1) manufacturing process of the intermediate resin film. The mixed powders were introduced into a hopper of a twin-screw kneading extruder (manufactured by TECHNOVEL CORPORATION) equipped with a T-die and were extruded at 270° C. to obtain an intermediate resin film in a thickness of 100 μm. The center plane average roughness (SRa) in the range of 5 mm×5 mm of the intermediate resin film was measured and resulted to be 4.9 nm, and the image clarity was 71%.

When the obtained intermediate resin film was directly used as a transparent screen, the total light transmittance was 89%, the haze value was 14%, and the transparency was sufficient. Further, the image sharpness was visually evaluated, whereby the image was clearly visualized by observing both from the front and the back. The viewing angle measured by a goniophotometer was ±24 degrees, which was found to result in excellent viewing angle property. However, the image clarity was 68%, and when the letters of the background were seen through the screen, they were distorted and difficult to be read.

Comparative Example 3

100 parts by mass of a PMMA pellet (Trade Name: ACRYPET VH; manufactured by Mitsubishi Rayon Co., Ltd.) and 0.01 part by mass of zirconium oxide powder (average diameter: 11 nm; manufactured by Kanto Denka Kogyo Co., Ltd.) were mixed homogeneously in the (1) manufacturing process of the intermediate resin film. The mixed powders were introduced into a hopper of an injection molding machine (manufactured by TECHNOVEL CORPORATION) equipped with a strand die and were extruded at 250° C. to obtain a PMMA pellet, which the zirconium oxide microparticles are dispersed therein. The obtained pellet was injected with an injection molding machine (Trade Name: FNX-III; manufactured by Nissei Plastic Industrial Co., Ltd.) at 270° C. to manufacture a board-form molding with a thickness of 4 mm and the length and width of 12 cm. The surface roughness SRa of the obtained board-like molding (an acrylic board) was 5.2 nm, and the image clarity was 66%.

When the obtained board-like molding was directly used as a transparent screen, the total light transmittance was 88%, the haze value was 16%, and the transparency was sufficient. Further, the image sharpness was visually evaluated, whereby the image was clearly visualized by observing from the back but the image was not clear by observing from the front. The viewing angle measured by a goniophotometer was ±25 degrees, which was found to result in excellent viewing angle property. However, the image clarity was 66%, and when the letters of the background were seen through the screen, they were distorted and difficult to be read.

Comparative Example 4

A layered body was manufactured in the same manner as Example 1, except that two glass substrates (SRa: 6.3 nm; thickness: 2 mm) were used in the (2) manufacturing process of the layered body.

When the obtained layered body was directly used as a transparent screen, the total light transmittance was 88%, the haze value was 16%, and the transparency was sufficient. Further, the image sharpness was visually evaluated, whereby the image was clearly visualized by observing both from the front and the back. The viewing angle measured by a goniophotometer was ±25 degrees, which was found to result in excellent viewing angle property. However, the image clarity was 65%, and when the letters of the background were seen through the screen, they were distorted and difficult to be read.

Comparative Example 5

An intermediate resin film was manufactured in the same manner as Example 1, except that 18 parts by mass of dry type silica particles (Trade Name: NHM-4N; hydrophobic; average diameter: 90 nm; manufactured by Tokuyama Corporation) were added as microparticles, and the thickness of the intermediate resin film was changed to 50 μm in the (1) manufacturing process of the intermediate resin film. Subsequently, a layered body was manufactured in the same manner as Example 1. The center plane average roughness (SRa) in the range of 5 mm×5 mm of the intermediate resin film was measured and resulted to be 6.6 nm, and the image clarity was 43%.

When the obtained layered body was directly used as a transparent screen, the total light transmittance was 88% and the image clarity was 85%. Further, the image sharpness was visually evaluated, whereby the image was clearly visualized by observation from the back; however, when observing from the front, the fineness of the projector image was poor, resulting in an unclear projected image. The viewing angle measured by a goniophotometer was ±33 degrees, which was found to result in excellent viewing angle property. However, the haze value was 37%, the transparency was poor, and since the screen was clouded, the letters of the background were unable to be read clearly.

Comparative Example 6

An intermediate resin film was manufactured in the same manner as Example 1, except that 0.3 part by mass of cross-linked acrylic resin beads (Part No: Techno Polymer MBX-40; average diameter: 40 μm; manufactured by Sekisui Plastics Co., Ltd.) were added as microparticles in the (1) manufacturing process of the intermediate resin film. The center plane average roughness (SRa) in the range of 5 mm×5 mm of the intermediate resin film was measured and resulted to be 7.4 nm, and the image clarity was 41%. Subsequently, a layered body was manufactured in the same manner as Example 1.

When the obtained layered body was directly used as a transparent screen, the total light transmittance was 87%, the haze value was 19%, and the image clarity was 81%. The viewing angle measured by a goniophotometer was ±20 degrees, which was found to result in excellent viewing angle property. However, when the image sharpness was visually evaluated, the fineness of the projector image was poor, observing both from the front and the back, and the projected image was unclear. It was not applicable for a screen.

Details of the various physicalities and the results of performance evaluation of the layered bodies and the transparent screens manufactured in the Examples and the Comparative Examples are shown in Table 1.

TABLE 1

| | Transparent substrate SRa [nm] | Intermediate resin film | | | | | | | Layered body | | | | | Transparent screen | | | |
|---|---|---|---|---|---|---|---|---|---|---|---|---|---|---|---|---|---|
| | | Type of micro-particles | Average diameter of micro-particles [nm] | Aspect ratio of micro-particles | Concentration of micro-particles [mass %] | SRa [nm] | Thickness [μm] | image clarity [%] | SRa of outermost surface [nm] | Thickness [mm] | Total light transmittance [%] | Haze value [%] | image clarity [%] | Transparency | Image sharpness Front observation | Image sharpness Back observation | Viewing angle [degrees] |
| Example 1 | 0.45 | Zirconium oxide | 11 | — | 0.3 | 5.8 | 100 | 66 | 0.45 | 4.1 | 89 | 14 | 94 | ○ | ○ | ◎ | ±24 |
| Example 2 | 0.06 | Zirconium oxide | 11 | — | 0.3 | 5.8 | 100 | 66 | 0.06 | 4.1 | 89 | 13 | 96 | ○ | ○ | ◎ | ±23 |
| Example 3 | 2.5 | Zirconium oxide | 11 | — | 0.3 | 5.8 | 100 | 66 | 2.5 | 4.1 | 89 | 14 | 90 | ○ | ○ | ◎ | ±24 |
| Example 4 | 4.5 | Zirconium oxide | 11 | — | 0.3 | 5.8 | 100 | 66 | 4.5 | 4.1 | 89 | 14 | 81 | ○ | ○ | ◎ | ±24 |
| Example 5 | 0.45 | Silica | 90 | — | 14 | 6.2 | 50 | 55 | 0.45 | 4.05 | 89 | 31 | 88 | ○ | ○ | ◎ | ±31 |
| Example 6 | 0.45 | Aluminum | 10000 | 300 | 0.008 | 5.4 | 100 | 70 | 0.45 | 4.1 | 87 | 4.3 | 94 | ○ | ◎ | ○ | ±15 |
| Example 7 | 0.45 | Aluminum | 10000 | 300 | 0.04 | 5.6 | 100 | 69 | 0.45 | 4.1 | 70 | 17 | 94 | ○ | ◎ | ◎ | ±25 |
| Example 8 | 0.45 | Zirconium oxide | 11 | — | 0.15 | 5.6 | 100 | 68 | 0.45 | 4.1 | 86 | 12 | 94 | ○ | ◎ | ◎ | ±23 |
| Example 9 | 0.45 | Aluminum | 10000 | 300 | 0.008 | 5.2 | 100 | 72 | 0.45 | 4.1 | 89 | 3.5 | 94 | ○ | ◎ | ◎ | ±14 |
| Example 10 | 0.1 | Aluminum | 1000 | 300 | 0.1 | 4.8 | 100 | 77 | 0.45 | 4.2 | 88 | 6.9 | 94 | ○ | ○ | ◎ | ±23 |
| Comparative Example 1 | 0.45 | Zirconium oxide | 11 | — | 0.3 | 5.8 | 100 | 66 | 5.8 | 2.1 | 89 | 14 | 65 | ○ | ○ | ○ | ±24 |
| Comparative Example 2 | — | Zirconium oxide | 11 | — | 0.3 | 4.9 | 100 | 71 | — | — | 89 | 14 | 68 | ○ | ○ | ○ | ±24 |
| Comparative Example 3 | — | Zirconium oxide | 11 | — | 0.01 | 5.2 | 4000 | 66 | — | — | 88 | 16 | 66 | ○ | △ | ○ | ±25 |
| Comparative Example 4 | 6.3 | Zirconium oxide | 11 | — | 0.3 | 5.8 | 100 | 66 | 6.3 | 4.1 | 88 | 16 | 65 | ○ | ○ | ○ | ±25 |
| Comparative Example 5 | 0.45 | Silica | 90 | — | 18 | 6.6 | 50 | 43 | 0.45 | 4.05 | 88 | 37 | 85 | × | △ | ◎ | ±33 |
| Comparative Example 6 | 0.45 | Cross-linked acrylic resin | 40 | — | 0.3 | 7.4 | 100 | 41 | 0.45 | 4.1 | 87 | 19 | 81 | ○ | × | × | ±20 |

DESCRIPTION OF SYMBOLS

10 See-through layered body
11 Microparticle
12 Intermediate resin film
13 Transparent substrate
21 Transparent screen
22 Viewer
23A, 23B Projection device
24A, 24B Projected light
25A, 25B Diffused light

The invention claimed is:

1. A transparent screen comprising a see-through layered body comprising an intermediate resin film and two transparent substrates holding the intermediate resin film, wherein
the intermediate resin film comprises a resin and from 0.0001 to 15% by mass of microparticles based on the resin, having an average diameter of from 1 nm to 100 μm,
a center plane average roughness SRa of outermost surfaces on both sides of the layered body is from 0.05 to 1.0 nm, and
an image clarity of the layered body is 70% or higher when measured by using an image clarity measuring device with an optical comb having a width of 0.125 mm.

2. The transparent screen according to claim 1, wherein the microparticles are selected from the group consisting of zirconium oxide, titanium oxide, aluminum oxide, magnesium oxide, cerium oxide, barium titanate, barium sulfate, calcium carbonate, silica, aluminum, silver, platinum, gold, titanium, nickel, tin, indium, diamond, tin-cobalt alloy, zinc sulfide, metal-coated mica, metal-coated glass, acrylic beads and styrene beads.

3. The transparent screen according to claim 1, wherein the microparticles have a content from 0.001 to 2% by mass based on the resin and an average diameter of from 10 nm to 5 μm.

4. The transparent screen according to claim 1, wherein a total light transmittance of the layered body is 65% or higher.

5. The transparent screen according to claim 1, wherein a haze value of the layered body is 35% or less.

6. The transparent screen according to claim 1, wherein a thickness of the layered body is from 10 μm to 100 mm.

7. The transparent screen according to claim 1, wherein the layered body further comprises a transparent substrate.

8. The transparent screen according to claim 1, wherein the transparent screen is a reflection type transparent screen.

9. The transparent screen according to claim 1, wherein the transparent screen is a transmission type transparent screen.

10. The transparent screen according to claim 1, wherein the microparticles are flake-form microparticles having an average aspect ratio of from 3 to 800.

11. The transparent screen according to claim 1, wherein the microparticles have a content from 0.0001 to 0.04% by mass based on the resin.

\* \* \* \* \*